United States Patent
Liaw

(12) 
(10) Patent No.: US 11,192,259 B2
(45) Date of Patent: Dec. 7, 2021

(54) GRINDING PACKAGE FITTED ON ROBOTIC ARM

(71) Applicant: X'POLE PRECISION TOOLS INC., Taoyuan (TW)

(72) Inventor: Yi-Jung Liaw, Taoyuan (TW)

(73) Assignee: X'POLE PRECISION TOOLS INC., Taoyuan (TW)

(*) Notice: Subject to any disclaimer, the term of this patent is extended or adjusted under 35 U.S.C. 154(b) by 560 days.

(21) Appl. No.: 15/982,376

(22) Filed: May 17, 2018

(65) Prior Publication Data

US 2019/0351559 A1    Nov. 21, 2019

(51) Int. Cl.
| | |
|---|---|
| B25J 11/00 | (2006.01) |
| B24B 27/04 | (2006.01) |
| B24B 47/14 | (2006.01) |
| B24D 9/08 | (2006.01) |

(52) U.S. Cl.
CPC ........... *B25J 11/0065* (2013.01); *B24B 27/04* (2013.01); *B24B 47/14* (2013.01); *B24D 9/08* (2013.01)

(58) Field of Classification Search
CPC ....... B24B 27/04; B24B 41/00; B24B 41/047; B24B 47/14; B24B 41/005; B24B 51/00; B24B 23/026; B24B 23/04; B24D 9/08; B25J 11/00; B25J 5/00; B25J 9/106; B25J 11/005; B25J 11/0065
USPC ...................................................... 451/5, 357
See application file for complete search history.

(56) References Cited

U.S. PATENT DOCUMENTS

| | | | | | |
|---|---|---|---|---|---|
| 2009/0255399 | A1* | 10/2009 | Hung | ...................... | F01C 13/02 91/471 |
| 2013/0273818 | A1* | 10/2013 | Guan | ................... | B25J 11/0065 451/270 |

FOREIGN PATENT DOCUMENTS

| | | | |
|---|---|---|---|
| CN | 204195518 U | | 3/2015 |
| CN | 2017-56780 E | * | 8/2017 |
| CN | 206632836 U | | 11/2017 |
| CN | 2018-18196 B | * | 2/2018 |
| EP | 3213867 A1 | * | 9/2017 ................ B25F 5/02 |
| JP | H0516065 A | | 1/1993 |
| JP | 2000216124 A | | 8/2000 |

(Continued)

OTHER PUBLICATIONS

Machine Translation CN 206383026 (Year: 2017).*
Machine Translation CN 107738185 (Year: 2018).*

*Primary Examiner* — Lee D Wilson
*Assistant Examiner* — Alberto Saenz
(74) *Attorney, Agent, or Firm* — Muncy, Geissler, Olds & Lowe, P.C.

(57) ABSTRACT

A grinding package fitted on robotic arm includes a main body, a pneumatic motor, a bridging part and a grinding tool. The main body is formed with a first space, a second space, a communicating hole communicating the first space to the second space, a connecting wall within the first space, an intake channel, an exhaust channel, openings of the first space and the second space respectively located on each of two parallel sides of the main body, the connecting wall having a ventilation hole. The pneumatic motor includes a motor body within the first space, and a transmission shaft connected to the motor body while extended from the second space through the communicating hole. The bridging part is combined with the main body and the robotic arm, the bridging part closing off the first space, the grinding tool (Continued)

facing the second space and being joined to the transmission shaft.

9 Claims, 9 Drawing Sheets

(56) References Cited

FOREIGN PATENT DOCUMENTS

| | | | |
|---|---|---|---|
| JP | 2007152502 | A | 6/2007 |
| JP | 2007260850 | A | 10/2007 |
| JP | 2012121133 | A | 6/2012 |
| JP | 2018001328 | A | 1/2018 |

* cited by examiner

GRINDING PACKAGE FITTED ON ROBOTIC ARM

FIELD OF THE INVENTION

The present invention is related to an application component of a robotic arm, particularly to a grinding package fitted on a robotic arm.

BACKGROUND OF THE INVENTION

Nowadays, grinding machine tools on robotic arms are generally implemented by electric motors, such as those disclosed in Pat. Nos. JP2000-216124A, JP2007-152502A, JP2007-260850A, JP2018-001328A, JP2012-121133A, JP05-016065A (1993) and CN 2041955180, and seldom implemented by pneumatic motors.

Next, in Pat. No. CN 206632836 U, although it is disclosed that a robotic arm is provided with a grinding machine tool implemented by a pneumatic motor, only the robotic arm directly equipped with the ready-made grinding machine tool sold by other manufacturers to is provided. In this manner, although it is possible for the robotic arm to perform the grinding operation, the work of the robotic arm is affected by the structure on the robotic arm for installing the grinding machine tool, such that the grinding operation of the robotic arm is restricted to some movements without flexible motion. In addition, there are doubts whether the structure is stable, since the grinding machine tool is not a primary structure or application structure of the robotic arm, even another auxiliary structure is mounted.

SUMMARY OF THE INVENTION

It is the main object of the present invention to solve the problem of a restricted movement of a robotic arm resulted from the conventional structure.

For achieving the above object, the present invention provides a grinding package fitted on a robotic arm, including a main body, a pneumatic motor, a bridging part and a grinding tool, the main body forming a first space, a second space, a communicating hole communicating the first space to the second space, a connecting wall being provided within the first space and separating the first space into an intake region and a working region, an intake channel communicated to the intake region, an exhaust channel communicated to the working region, openings of the first space and the second space being respectively located on each of two parallel sides of the main body, the connecting wall being provided with a ventilation hole communicating the intake region to the working region. The pneumatic motor includes a motor body provided within the working region, and a transmission shaft connected to the motor body while extended from the second space through the communicating hole. The bridging part is combined with the main body and the robotic arm, the bridging part closing off the first space, in such a way that a working gas from the intake channel being only discharged from the exhaust channel through the intake region and the working region, the grinding tool facing the second space and being joined to the transmission shaft, the grinding tool being turned by the transmission shaft, which is turned by impelling the motor body by the working gas.

In one embodiment, the main body includes a first part and a second part, which may be dismantled selectively, the first part being formed with the first space, the connecting wall, the intake channel and the exhaust channel, while the second part being formed thereon with the second space and the communicating hole.

In one embodiment, the first part is provided with at least one first threaded hole, while the second part is provided with a second threaded hole facing the first threaded hole after the second part and the first part are joined to each other.

In one embodiment, the second part is provided with an assembling bump being mounted within the first space and having the communicating hole.

In one embodiment, the main body is provided with a bearing mounting groove being located within the second space and corresponding to the communicating hole, the grinding package being provided with a first bearing being located in the bearing mounting groove and allowing the transmission shaft passing therethrough.

In one embodiment, the pneumatic motor is provided with a cover plate, the cover plate having a plate body constrained by the main body and the bridging part cooperatively, a through-hole being provided with the plate body and allowing the transmission shaft passing therethrough, and a first annular wall located on the plate body and centered at the through-hole, the grinding package being provided with a second bearing located within a space encircled by the first annular wall and joined to the transmission shaft.

In one embodiment, the bridging part is provided with a second annular wall protruding in a direction toward the first space and fastening the first annular wall.

In one embodiment, the bridging part is provided with a vent hole located within a region encircled by the second annular wall.

In one embodiment, the pneumatic motor is provided with an eccentric block combined with the transmission shaft and located within the second space, the eccentric block being joined to the grinding tool while a shaft center of the grinding tool deviating from the transmission shaft.

In one embodiment, the main body is provided with at least one third threaded hole, while the bridging part is provided with a fourth threaded hole facing the third threaded hole after the bridging part and the main body are joined to each other.

In one embodiment, the bridging part is provided with a plurality of fifth threaded holes used for connecting the robotic arm, respectively.

In comparison with the prior art, there are features, achieved by the disclosure mentioned above in the present invention, as follows.

The better structural stability is obtained just after the grinding package of the present invention is combined with the robotic arm directly without the need for additional structural reinforcement. Additionally, the operation of the robotic arm is not restricted anymore due to the use of the grinding package.

DETAILED DESCRIPTION OF THE PREFERRED EMBODIMENTS

Figure 1:
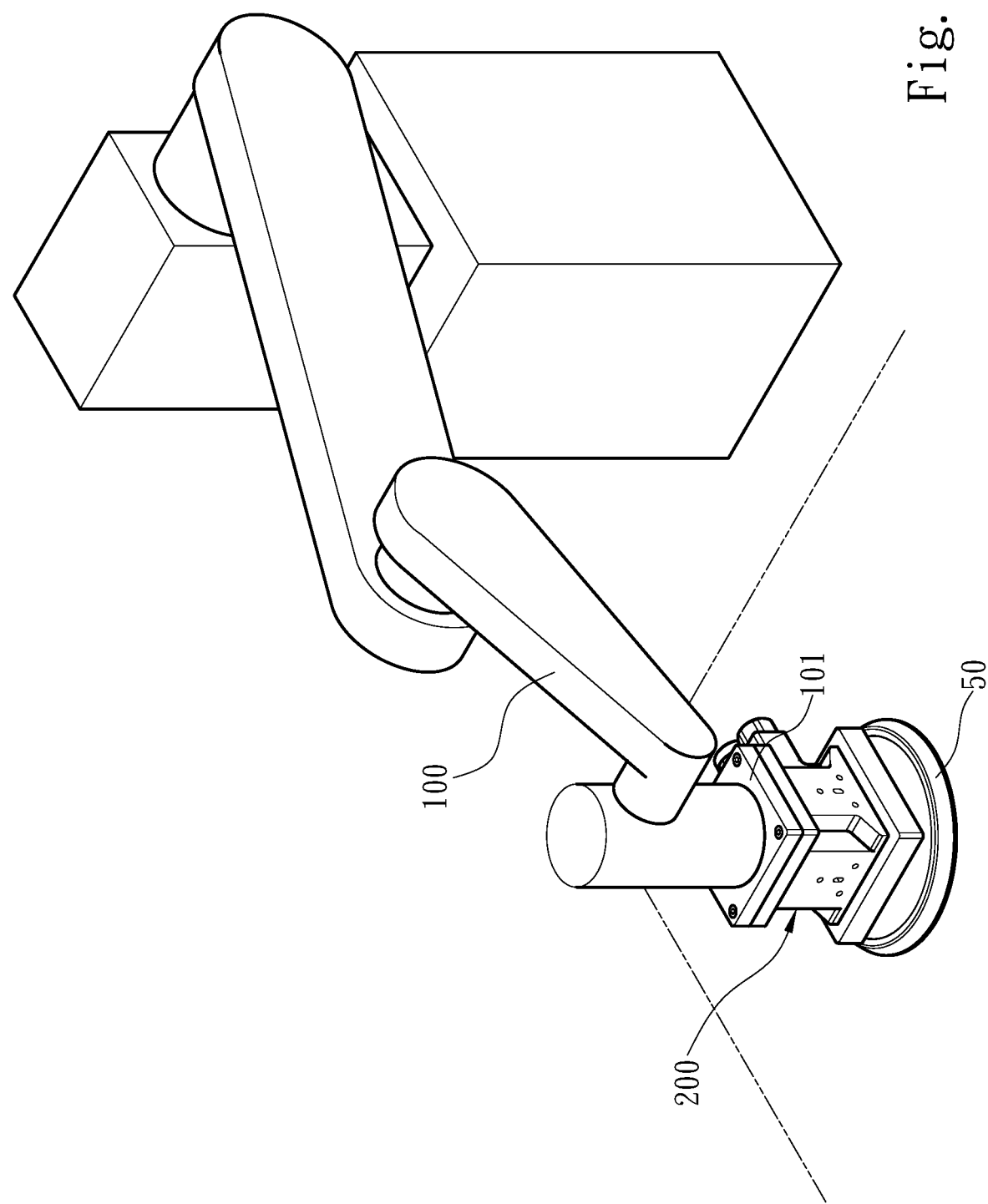
FIG. 1 is a diagram of implementation of a first embodiment of the present invention fitted on a robotic arm.
Figure 2:
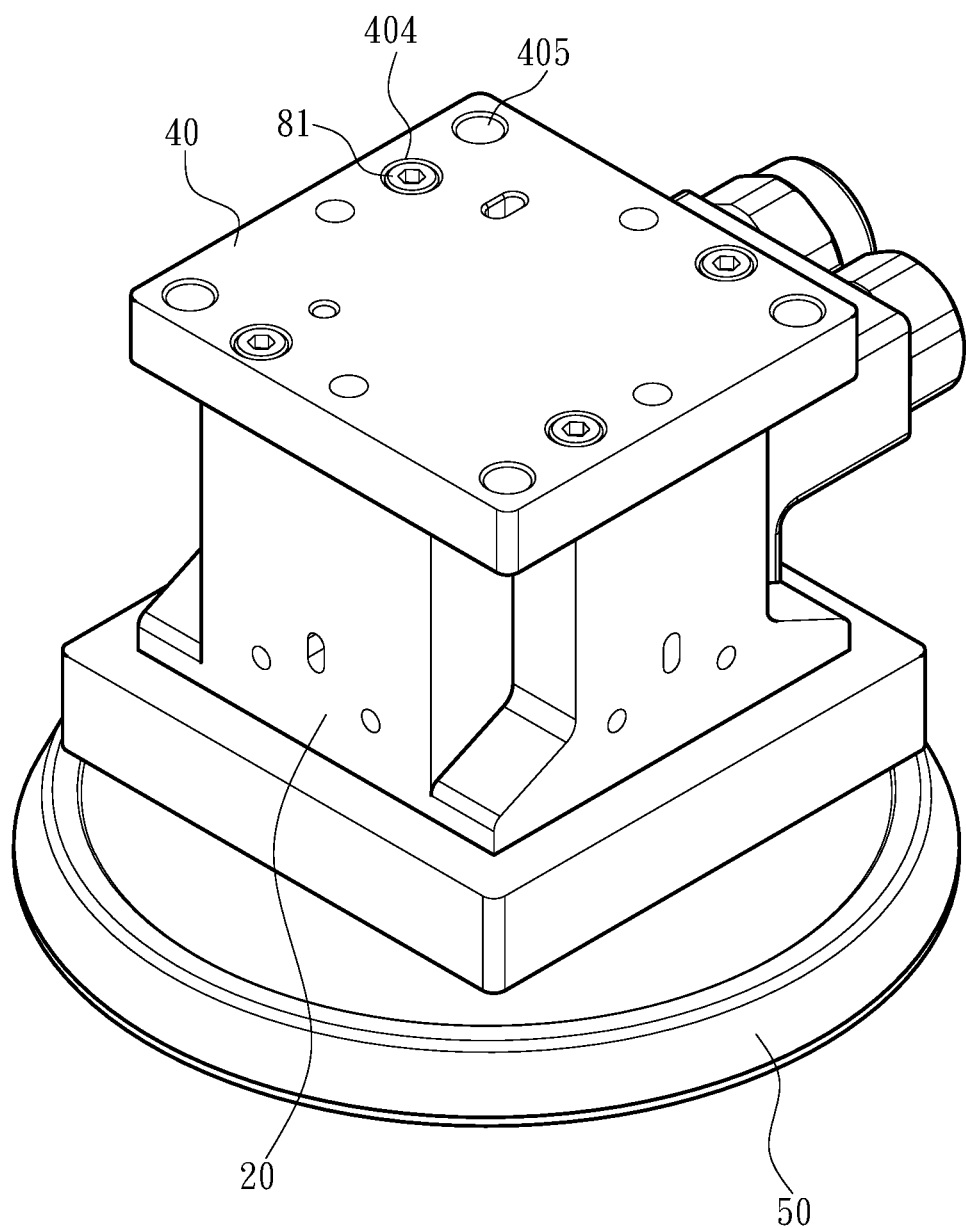
FIG. 2 is a structural diagram of the first embodiment of the present invention.
Figure 3:
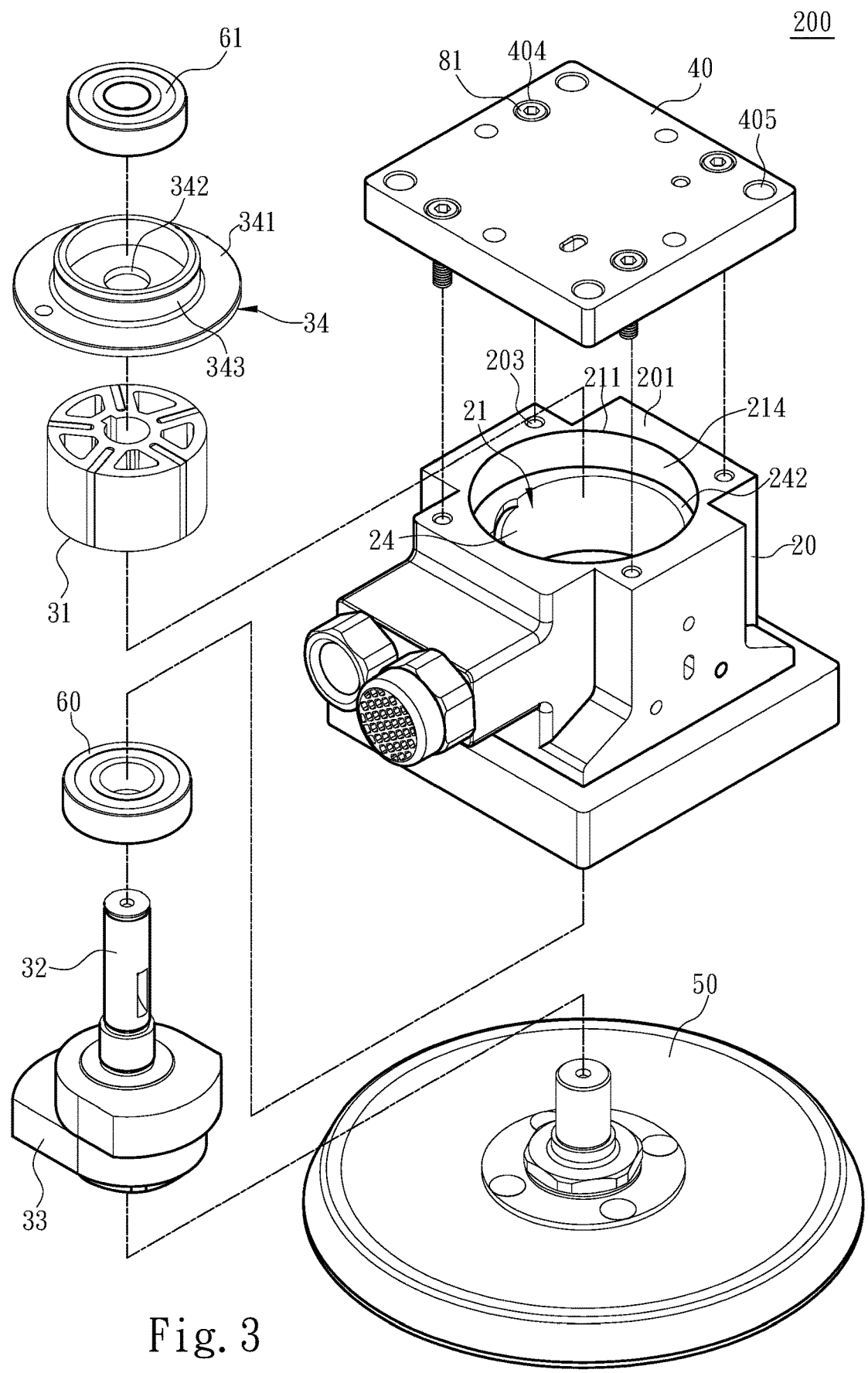
FIG. 3 is an exploded structural diagram of the first embodiment of the present invention.
Figure 4:
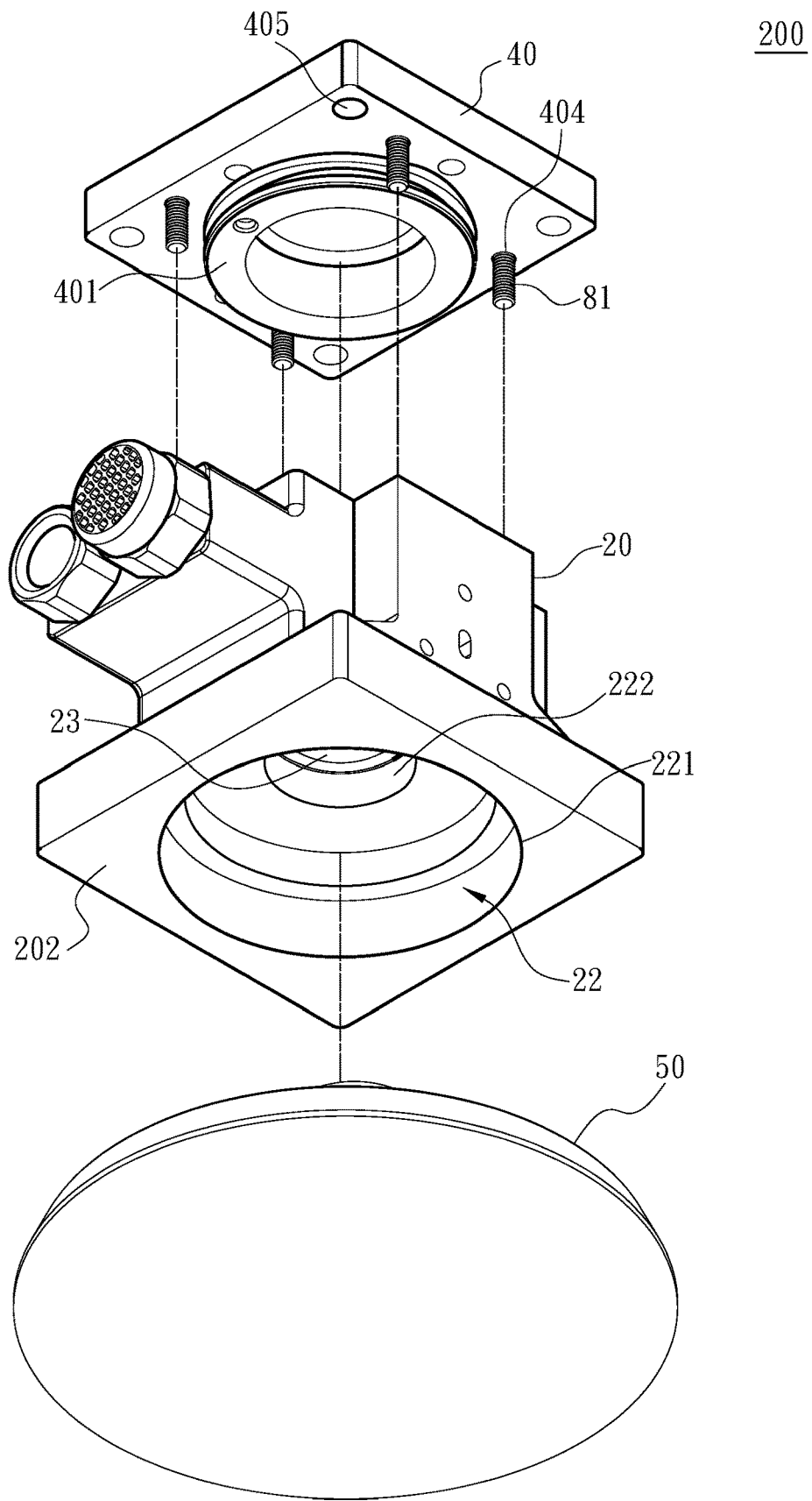
FIG. 4 is an exploded structural diagram in another direction of the first embodiment of the present invention.
Figure 5:
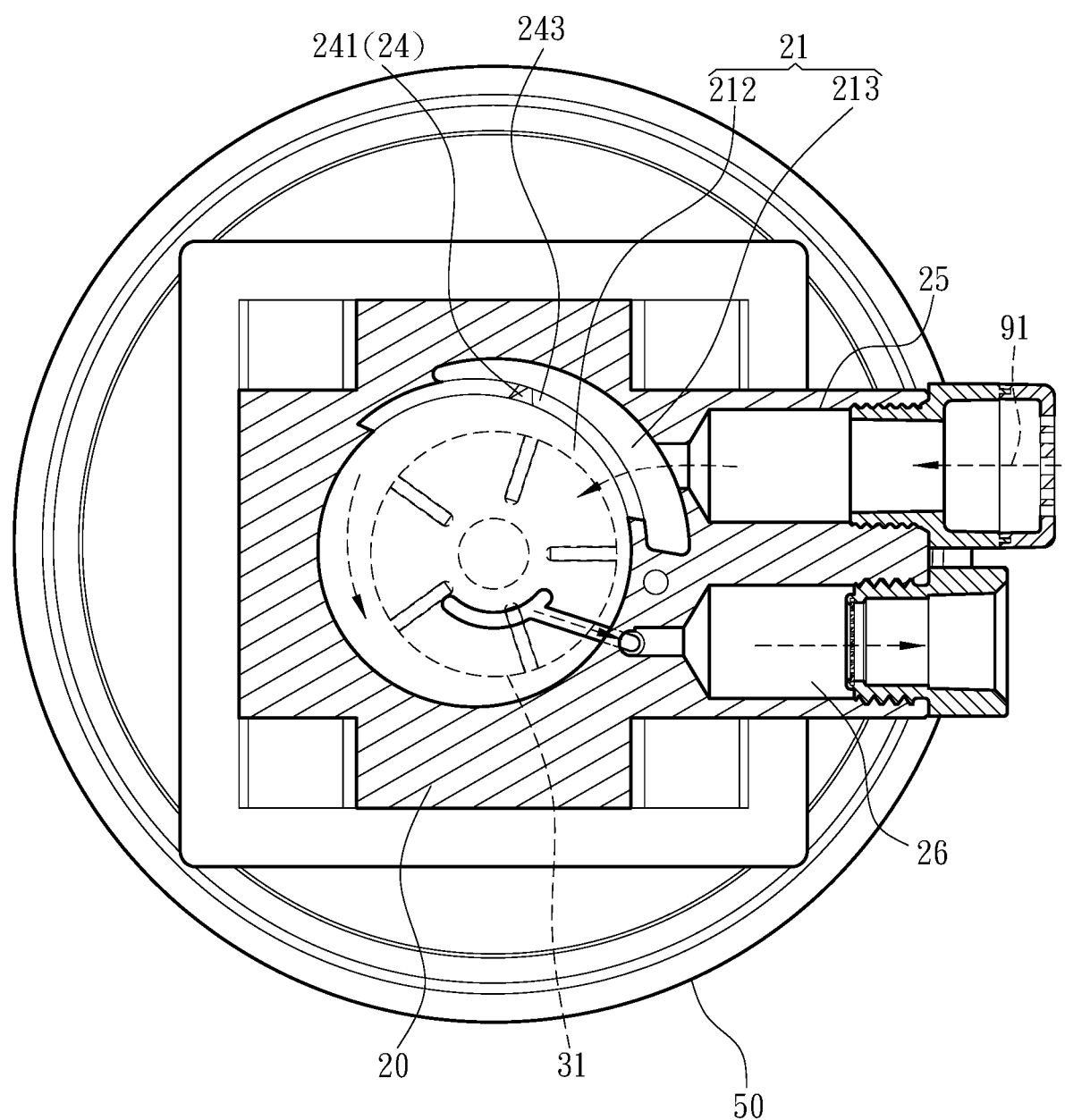
FIG. 5 is a first cross-sectional structural diagram of the first embodiment of the present invention.
Figure 6:
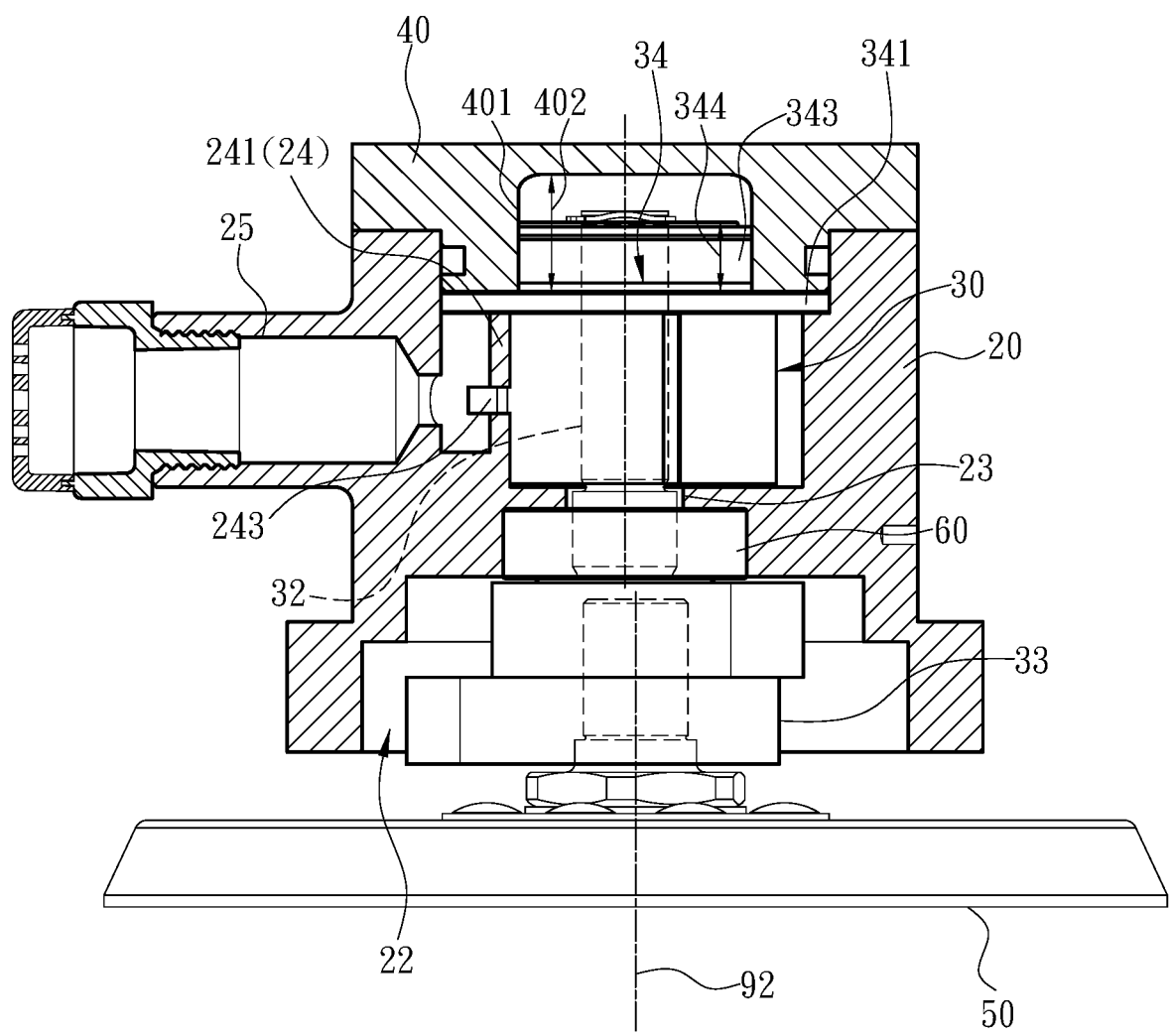
FIG. 6 is a second cross-sectional structural diagram of the first embodiment of the present invention.

The detailed description and technical content of the present invention will now be described, in conjunction with drawings, as follows.

Referring to FIGS. 1, 2, 3, 4, 5 and 6, the present invention provides a grinding package 200 fitted on a robotic arm 100, the grinding package 200 being an application package for the robotic arm 100. The grinding package 200 is arranged at the end of the robotic arm 100, and controlled by an electric control module (not shown in the figures) of the robotic arm 100.

Next, the grinding package 200 includes a main body 20, a pneumatic motor 30, a bridging part 40 and a grinding tool 50. In this case, the main body 20 is formed with a first space 21 and a second space 22, the first space 21 and the second space 22 being in the form of a trough, respectively. An opening 211 of the first space 21 and an opening 221 of the second space 22 are respectively located on each of two parallel sides (as indicated by 201, 202 in FIGS. 3 and 4) of the main body 20; that is to say, the opening 211 of the first space 21 and the opening 221 of the second space 22 are directed toward opposed directions. Further, the first space 21 and the second space 22 are located on the same axis. In addition, the main body 20 is further formed with a communicating hole 23 communicating the first space 21 to the second space 22, a connecting wall 24 provided within the first space 21, an intake channel 25 communicated to the first space 21, and an exhaust channel 26 communicated to the second space 22. In this case, the hole diameter of the communicating hole 23 is significantly smaller than the aperture of each of the openings 211, 221 of the first space 21 and the second space 22. Further, the connecting wall 24 and the main body 20 are integrally formed, and the connecting wall 24 is placed within the first space 21, such that the first space 21 is separated into an intake region 212 and a working region 213, the intake channel 25 corresponding to the intake region 212, while the exhaust channel 26 corresponding to the working region 213. Furthermore, the connecting wall 24 is not provided at the center of the first space 21, in such a way that the intake region 212 is smaller than the working region 213, with the working region 213 approaching a circle more. Further, the height of the connecting wall 24 is not equated with the depth of the first space 21; that is to say, the top end of the connecting wall 24 is not flush with one of the sides 201 of the main body 20. In one embodiment, the connecting wall 24 may be provided in the form of a circular ring, in which one portion 241 of the connecting wall 24 is placed within the first space 21, while another portion 242 may be provided along an inner wall 214 of the first space 21. Furthermore, the connecting wall 24 is further provided thereon with a ventilation hole 243, the ventilation hole 243 communicating the intake region 212 to the working region 213. In one embodiment, the ventilation hole 243 may be an oblong hole.

Referring to FIGS. 3, 4, 5 and 6 again, the pneumatic motor 30 includes a motor body 31 provided within the working region 213, and a transmission shaft 32 connected to the motor body 31. The motor body 31 is placed into and then located in the working region 213 through the opening 211 of the first space 21, while the transmission shaft 32 is extended from the second space 22 through the communicating hole 23 when the pneumatic motor 30 is put into the working region 213. Furthermore, the pneumatic motor 30 is provided with an eccentric block 33 combined with the transmission shaft 32 and located within the second space 22, the eccentric block 33 being joined to the grinding tool 50 while a shaft center 92 of the grinding tool 50 deviating from the center of the transmission shaft 32. Additionally, the bridging part 40 may be provided in the form of a plate. The bridging part 40 is combined with the main body 20 and the robotic arm 100. The bridging part 40 is mounted on the one side 201, having the opening 211 of the first space 21, of the main body 20, and the bridging part 40 is allowed to close off the first space 21, in such a way that a working gas 91 from the intake channel 25 is only discharged from the exhaust channel 26 through the intake region 212 and the working region 213. Furthermore, the bridging part 40 is combined with a joining holder 101 of the robotic arm 100. Moreover, the grinding tool 50 may be a grinding disc or other elements allowed for carrying out grinding. The grinding tool 50, facing the second space 22 and being joined to the transmission shaft 32, is turned by the transmission shaft 32, which is turned by impelling the motor body 31 by the working gas 91.

Referring to FIG. 5 again, a process, in which the present invention is implemented, is further described. The grinding operation is performed on an object (not shown in the figure) in accordance with the movement of the robotic arm 100 after the grinding package 200 and the robotic arm 100 are combined together. The exhaust channel 26 is connected to an air extracting module (not shown in the figure) before grinding. During the grinding operation, the air extracting module is started to extract gas within the first space 21 through the exhaust channel 26, so as to form a negative pressure in the first space 21. Afterward, the working gas 91 originally located outside the main body 20 is drawn into the intake region 212 and the working region 213 in turn through the intake channel 25. Moreover, the motor body 31 is impelled by the working gas 91 to turn, and then drive the transmission shaft 32 to rotate, when the working gas 91 enters the working region 213. Further, the grinding tool 50 is driven to rotate so as to perform the grinding operation when the transmission shaft 32 is turned. Next, after impelling the motor body 31, the working gas 91 is expelled from the first space 21 through the exhaust channel 26 toward the air extracting module.

Figure 7:
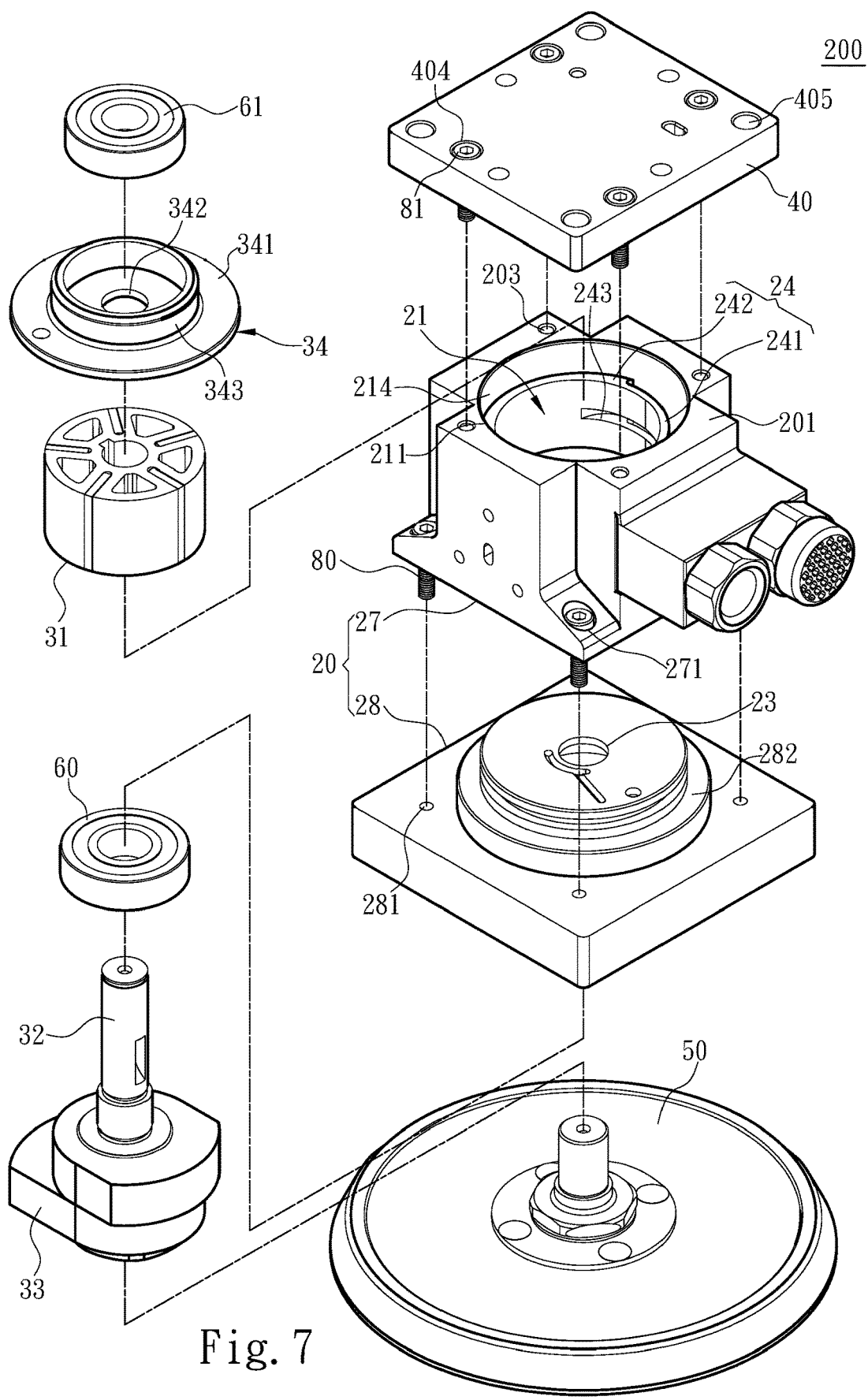
FIG. 7 is an exploded structural diagram of a second embodiment of the present invention.
Figure 8:
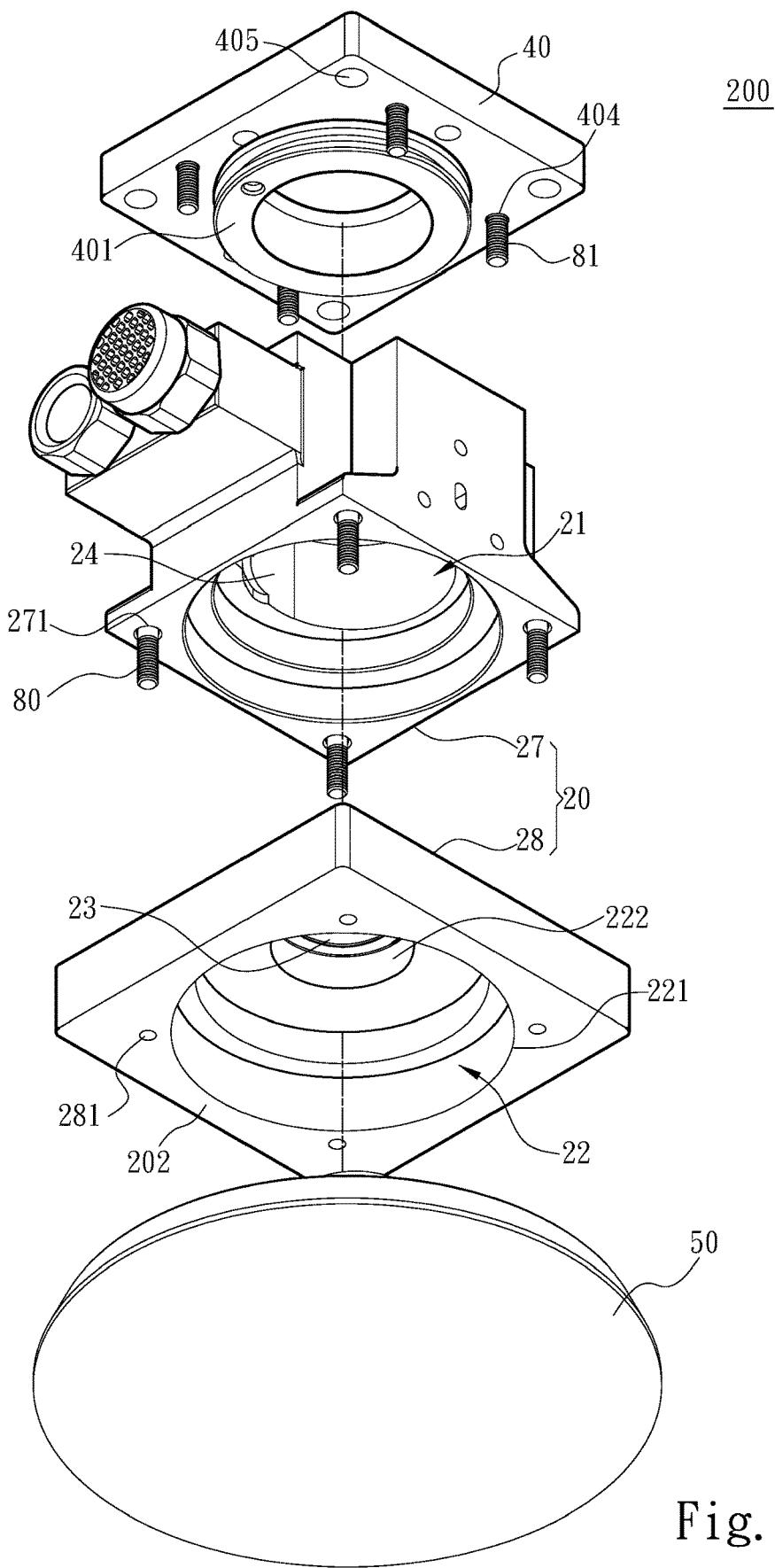
FIG. 8 is an exploded structural diagram in another direction of the second embodiment of the present invention.
Figure 9:
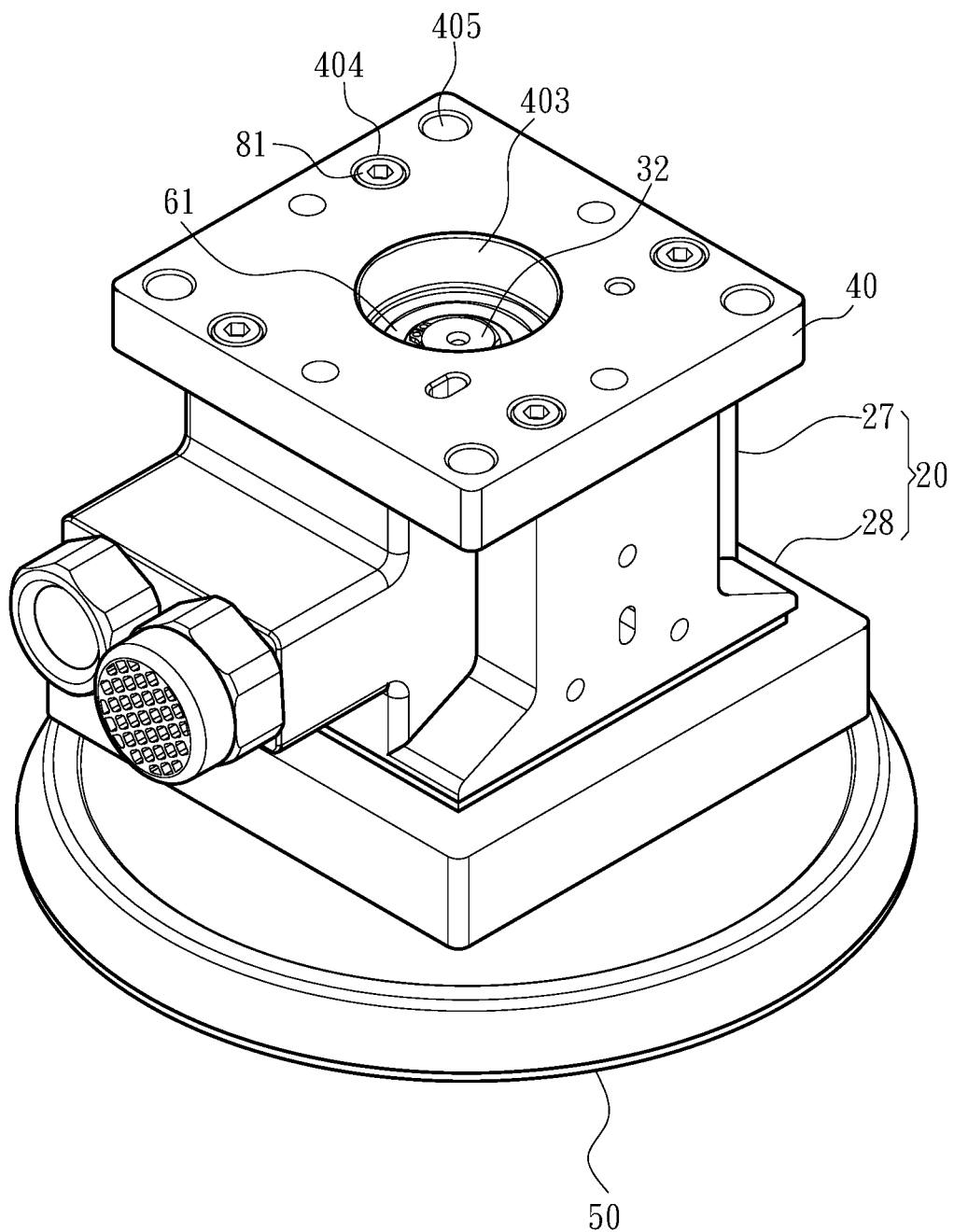
FIG. 9 is a structural diagram of a third embodiment of the present invention.

Referring to FIGS. 7, 8, and 9, the main body 20 of the present invention may be formed integrally or composed of several parts in accordance with the practical needs. In one embodiment, the main body 20 includes a first part 27 and a second part 28, which may be dismantled selectively. The first part 27 is formed with the first space 21, the connecting wall 24, the intake channel 25 and the exhaust channel 26, while the second part 28 is formed thereon with the second space 22 and the communicating hole 23. Furthermore, the first part 27 is provided with at least one first threaded hole 271, while the second part 28 is provided with a second threaded hole 281 facing the first threaded hole 271 after the second part 28 and the first part 27 are joined to each other. A screwed-connection element 80 is jointly provided in the first threaded hole 271 and the second threaded hole 281, so as to fix the first part 27 to the second part 28. In one embodiment, in addition, the second part 28 is provided with an assembling bump 282 being mounted within the first space 21 and having the communicating hole 23. The assembling bump 282 is formed at one side, without the opening 221 of the second space 22, of the second part 28. The rising extent of the assembling bump 282 is dependent on the depth of the second space 22, and the shape of the assembling bump 282 is in correspondence with the first space 21.

Referring to FIGS. 4, 6 and 8 again, the main body 20 is provided with a bearing mounting groove 222 being located within the second space 22 and corresponding to the communicating hole 23. The grinding package 200 is provided with a first bearing 60 being located in the bearing mounting groove 222 and allowing the transmission shaft 32 passing therethrough. In addition to facilitating the rotation of the transmission shaft 32, the first bearing 60 is further used for fixing the pneumatic motor 30. More specifically, the hole diameter of the communicating hole 23 should be larger than the diameter of the transmission shaft 32, so as to avoid the effect on work due to excessive friction force generated between the transmission shaft 32 and the communicating hole 23. In this manner, the pneumatic motor 30 may be then supported by the first bearing 60, such that the bottom edge of the motor body 31 is not in contact with the bottom of the first space 21. Additionally, the pneumatic motor 30 is provided with a cover plate 34, which is located at one side, facing the bridging part 40, of the motor body 31. The cover plate 34 is provided with a plate body 341 constrained by the main body 20 and the bridging part 40 cooperatively, a through-hole 342 being provided with the plate body 341 and allowing the transmission shaft 32 passing therethrough, and a first annular wall 343 located on the plate body 341 and centered at the through-hole 342, the first annular wall 343 not adjoining the through-hole 342 while surrounding the through-hole 342 at a distance away therefrom. Further, the grinding package 200 is provided with a second bearing 61 located within a space encircled by the first annular wall 343 and joined to the transmission shaft 32. The pneumatic motor 30 is supported by the second bearing 61 and the first bearing 60 cooperatively, so as to enable stable rotation of the pneumatic motor 30. In one embodiment, the bridging part 40 is provided with a second annular wall 401 protruding in a direction toward the first space 21 and fastening the first annular wall 343. Narrowly speaking, the inner diameter of the second annular wall 401 is equivalent to the outer diameter of the first annular wall 343, and height 402 of the second annular wall 401 is larger than a height 344 of the first annular wall 343. Referring to FIG. 9, in addition, the bridging part 40 in one embodiment is provided with a vent hole 403 located within a region encircled by the second annular wall 401. Convective heat transfer between the second bearing 61, located within the region encircled by the second annular wall 401, and outside air is possible due to the provision of the vent hole 403, so as to avoid heat excessively accumulated on the second bearing 61.

Referring to FIGS. 3, 4 and 7 again, the main body 20 is provided with at least one third threaded hole 203, while the bridging part 40 is provided with a fourth threaded hole 404 facing the third threaded hole 203 after the bridging part 40 and the main body 20 are joined to each other. Another screwed-connection element 81 is jointly provided in the third threaded hole 203 and the fourth threaded hole 404, so as to fix the bridging part 40 to the main body 20. Additionally, the bridging part 40 is provided with a plurality of fifth threaded holes 405 used for connecting the robotic arm 100, respectively. A screwed-connection element (not shown in the figures) may be also provided to be joined to each of the plurality of fifth threaded holes 405.

What is claimed is:

1. A grinding package fitted on a robotic arm, comprising:
a main body forming a first space, a second space, a communicating hole communicating the first space to the second space, a connecting wall being provided within the first space and separating the first space into an intake region and a working region, an intake channel communicated to the intake region, an exhaust channel communicated to the working region, openings of the first space and the second space being respectively located on each of two parallel sides of the main body, the connecting wall being provided with a ventilation hole communicating the intake region to the working region;
a pneumatic motor including a motor body provided within the working region, and a transmission shaft connected to the motor body while extended from the second space through the communicating hole, and a cover plate, wherein the cover plate comprises a plate body constrained by the main body and a bridging part cooperatively, a through-hole provided with the plate body and allowing the transmission shaft passing therethrough, and a first annular wall located on the plate body and centered at the through-hole;
the bridging part combined with the main body and the robotic arm, the bridging part provided with a second annular wall protruding in a direction toward the first space and fastening the first annular wall, and the bridging part closing off the first space, in such a way that a working gas from the intake channel being only discharged from the exhaust channel through the intake region and the working region; and
a grinding tool facing the second space and being joined to the transmission shaft, the grinding tool being turned by the transmission shaft, which is turned by impelling the motor body by the working gas.

2. The grinding package fitted on robotic arm according to claim 1, wherein the main body includes a first part and a second part, which may be dismantled selectively, the first part being formed with the first space, the connecting wall, the intake channel and the exhaust channel, while the second part being formed thereon with the second space and the communicating hole.

3. The grinding package fitted on robotic arm according to claim 2, wherein the first part is provided with at least one first threaded hole, while the second part is provided with a second threaded hole facing the first threaded hole after the second part and the first part are joined to each other.

4. The grinding package fitted on robotic arm according to claim 3, wherein the second part is provided with an assembling bump being mounted within the first space and including the communicating hole.

5. The grinding package fitted on robotic arm according to claim 1, wherein the main body is provided with a bearing mounting groove being located within the second space and corresponding to the communicating hole, the grinding package being provided with a first bearing being located in the bearing mounting groove and allowing the transmission shaft passing therethrough.

6. The grinding package fitted on robotic arm according to claim 5, wherein the grinding package being provided with a second bearing located within a space encircled by the first annular wall and joined to the transmission shaft.

7. The grinding package fitted on robotic arm according to claim 1, wherein the pneumatic motor is provided with an eccentric block combined with the transmission shaft and located within the second space, the eccentric block being joined to the grinding tool while a shaft center of the grinding tool deviating from the transmission shaft.

8. The grinding package fitted on robotic arm according to claim 1, wherein the main body is provided with at least one third threaded hole, while the bridging part is provided with a fourth threaded hole facing the third threaded hole after the bridging part and the main body are joined to each other.

9. The grinding package fitted on robotic arm according to claim 8, wherein the bridging part is provided with a plurality of fifth threaded holes used for connecting the robotic arm, respectively.

\* \* \* \* \*